United States Patent
Mullett

(10) Patent No.: US 11,456,874 B2
(45) Date of Patent: Sep. 27, 2022

(54) VEHICLE CONTROL SYSTEM FOR CYBERSECURITY AND FINANCIAL TRANSACTIONS

(71) Applicants: DENSO International America, Inc., Southfield, MI (US); DENSO CORPORATION, Aichi (JP)

(72) Inventor: Reilly Patrick Mullett, Livonia, MI (US)

(73) Assignees: DENSO INTERNATIONAL AMERICA, INC., Southfield (MI); DENSO CORPORATION, Aichi (JP)

( * ) Notice: Subject to any disclaimer, the term of this patent is extended or adjusted under 35 U.S.C. 154(b) by 499 days.

(21) Appl. No.: 16/575,950

(22) Filed: Sep. 19, 2019

(65) Prior Publication Data

US 2021/0091956 A1 Mar. 25, 2021

(51) Int. Cl.
*H04L 9/32* (2006.01)
*G06F 8/71* (2018.01)
(Continued)

(52) U.S. Cl.
CPC .............. *H04L 9/3236* (2013.01); *G06F 8/60* (2013.01); *G06F 8/71* (2013.01); *G06Q 20/3678* (2013.01);
(Continued)

(58) Field of Classification Search
CPC ... H04L 9/0825; H04L 9/3236; H04L 9/3239; H04L 9/3247; H04L 2209/38;
(Continued)

(56) References Cited

U.S. PATENT DOCUMENTS 10,181,948 B1   1/2019  Nenov et al.
10,447,483 B1 * 10/2019  Su ............................ G06F 8/65
(Continued)

FOREIGN PATENT DOCUMENTS

DE      102017128679    6/2019
GB          2562054   11/2018
WO       2019034621    2/2019

OTHER PUBLICATIONS

Reifenrath, Christoph "Intelligent Cars pay by Themselves" [Online], Dec. 20, 2017 [Retrieved on Mar. 21, 2022], www.zf.com, Retrieved from: < https://www.zf.com/mobile/en/stories_3265.html > (Year: 2017).*

(Continued)

*Primary Examiner* — Eric W Shepperd
(74) *Attorney, Agent, or Firm* — Burris Law, PLLC

(57) ABSTRACT

A vehicle control system includes a controller that is configured to include a memory, a verification module, and a software control module. The memory includes a software version repository to store a public address and one or more software hashes associated with the public address. The verification module is configured to verify a software upload request that includes a recommended software program to be uploaded. The verification module is configured to determine whether a contingent software hash that is indicative of the recommended software program matches a current software hash. The software control module is configured to acquire the recommended software program in response to the contingent software hash matching the current software hash.

20 Claims, 10 Drawing Sheets

(51) Int. Cl.
*G06F 8/60* (2018.01)
*G06Q 20/36* (2012.01)
*H04L 9/08* (2006.01)
*B60W 50/00* (2006.01)
*H04L 9/00* (2022.01)

(52) U.S. Cl.
CPC ........... *H04L 9/0825* (2013.01); *B60W 50/00* (2013.01); *B60W 2050/0083* (2013.01); *H04L 9/50* (2022.05)

(58) Field of Classification Search
CPC ............. H04L 2209/56; H04L 2209/84; H04L 63/0876; H04L 63/1483; B60W 50/00; G06F 8/60; G06F 8/71; G06Q 20/065; G06Q 20/3678
See application file for complete search history.

(56) References Cited

U.S. PATENT DOCUMENTS

| | | | | |
|---|---|---|---|---|
| 10,447,668 | B1* | 10/2019 | Norum | H04L 9/3242 |
| 10,666,767 | B1* | 5/2020 | Floyd | H04W 12/10 |
| 10,776,286 | B1* | 9/2020 | Kulchytskyy | G06F 8/65 |
| 2005/0099265 | A1* | 5/2005 | Dix | G07C 9/00309 340/5.21 |
| 2006/0261935 | A1* | 11/2006 | McAden | B60R 25/00 340/431 |
| 2009/0024525 | A1* | 1/2009 | Blumer | G06Q 20/10 705/41 |
| 2009/0119657 | A1 | 5/2009 | Link, II | |
| 2015/0220916 | A1* | 8/2015 | Prakash | G06Q 20/40 705/41 |
| 2016/0283920 | A1 | 9/2016 | Fisher et al. | |
| 2016/0292672 | A1 | 10/2016 | Fay et al. | |
| 2017/0139778 | A1* | 5/2017 | Kito | G06F 11/1433 |
| 2018/0191502 | A1 | 7/2018 | Karame | |
| 2018/0218454 | A1* | 8/2018 | Simon | G06Q 40/08 |
| 2019/0026829 | A1 | 1/2019 | Nakata et al. | |
| 2019/0050217 | A1 | 2/2019 | Tatourian | |
| 2019/0384587 | A1* | 12/2019 | Rao | H04W 4/42 |
| 2020/0073651 | A1* | 3/2020 | Rodriguez Bravo | H04L 9/0637 |
| 2020/0073657 | A1* | 3/2020 | Robison | G06F 9/44589 |
| 2020/0153633 | A1* | 5/2020 | Park | H04L 9/3239 |
| 2020/0219337 | A1* | 7/2020 | Kwak | G07C 5/0858 |
| 2020/0235936 | A1 | 7/2020 | Schnabel et al. | |
| 2020/0348923 | A1* | 11/2020 | Mezaael | G06F 8/65 |
| 2022/0012043 | A1* | 1/2022 | Sakurai | H04L 9/3239 |

OTHER PUBLICATIONS

International Search Report for International Application PCT/JP2020/030418, dated Nov. 10, 2020.

* cited by examiner

VEHICLE CONTROL SYSTEM FOR CYBERSECURITY AND FINANCIAL TRANSACTIONS

FIELD

The present disclosure relates to cybersecurity for a vehicle system.

BACKGROUND

The statements in this section merely provide background information related to the present disclosure and may not constitute prior art.

Advancements in the area of vehicle automation have set forth complex vehicle control systems that include sophisticated software applications/programs for controlling a vehicle. For example, a controller can be configured to control subsystems within a vehicle, such as brakes, powertrain, and steering, to perform different automated operations, such as collision avoidance, adaptive cruise control, and lane change assist, among other operations. The software programs stored and executed by the controllers can be accessible by a vehicle service department to, for example, perform diagnostics, adjust vehicle set-points, and/or access update software programs.

In addition to advancements in vehicle automation, technological improvements have also been made in vehicle connectivity to support vehicle-to-everything (V2X) communication. Specifically, vehicles, roadside devices, cloud-based network, and cellular phones, among other components, form distributed computing systems for sharing and processing data. Accordingly, vehicles may undergo remote diagnostic procedures via V2X communication. Vehicle connectivity also allows ill intended parties to hack into a vehicle controller and possibly modify the software programs relied upon for controlling the vehicle. These and other issues are addressed by the present disclosure.

SUMMARY

This section provides a general summary of the disclosure and is not a comprehensive disclosure of its full scope or all of its features.

In one form, the present disclosure is directed towards a controller configured to include a memory, a verification module, and a software control module. The memory includes a software version repository that stores a public address and one or more software hashes associated with the public address. The verification module is configured to verify a software upload request that includes a recommended software program to be uploaded. The verification module is configured to determine whether a contingent software hash indicative of the recommended software program matches a current software hash. The software control module is configured to acquire the recommended software program in response to the contingent software hash matching the current software hash and to store the current software hash in the software version repository.

In one form, the present disclosure is directed toward a method that includes storing, in a memory provided in a vehicle controller, a public address and one or more software hashes associated with the public address. The public address is for a vehicle fleet comprising at least one vehicle. The method further includes receiving a recommended software program to be uploaded by the vehicle controller, determining whether a contingent software hash indicative of the recommended software program matches a current software hash, and storing the recommended software program in response to the contingent software hash matching the current software hash.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
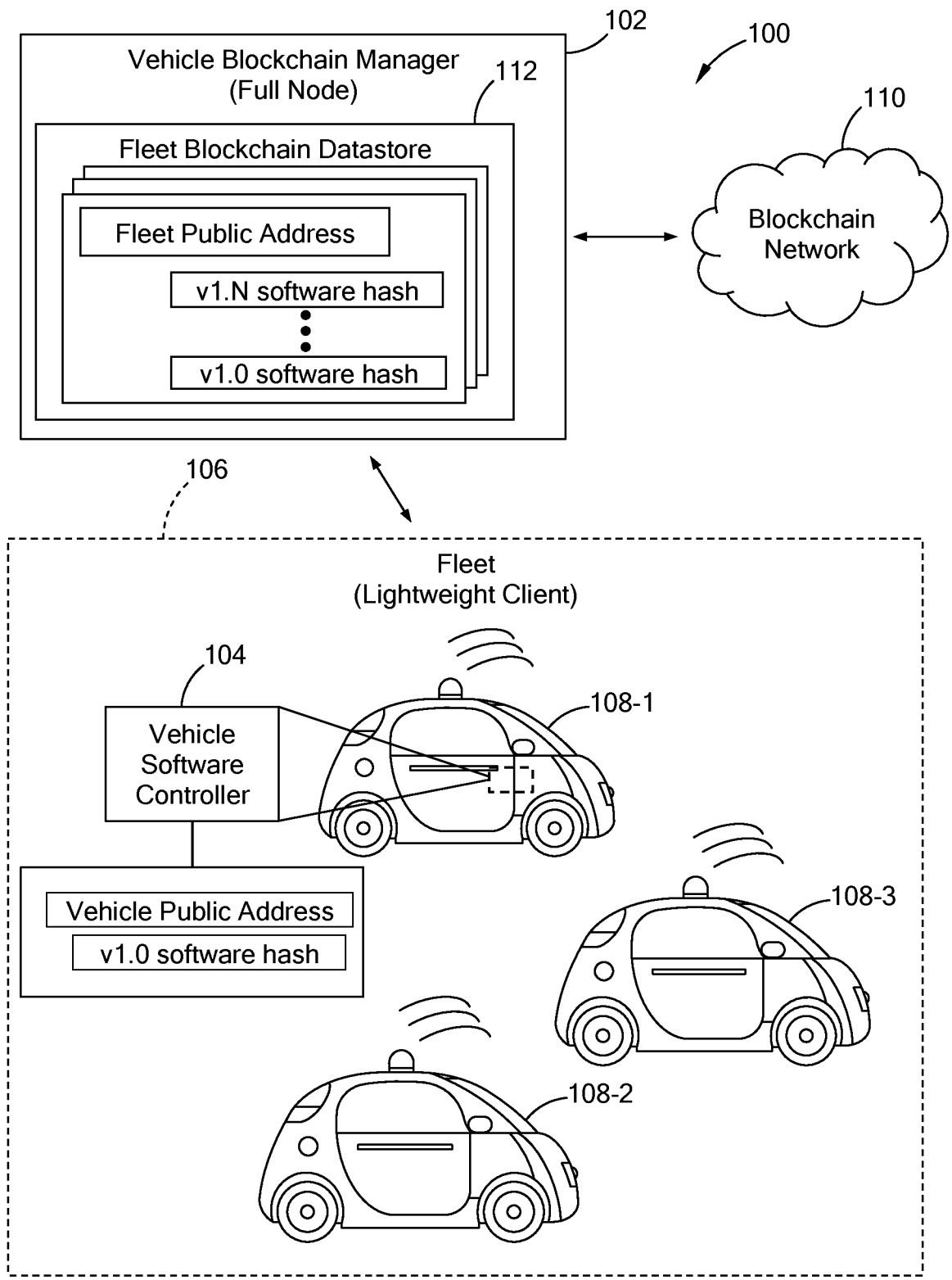
FIG. 1 illustrates a vehicle authentication system in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

While cybersecurity is typically discussed in the context of servers storing personal or proprietary information, cybersecurity is also pertinent in protecting vehicles from potential software hacks. The present disclosure is directed toward a vehicle authentication system to provide a secure and trustless verification of data for a vehicle fleet and to provide a platform for vehicle financial transactions.

Referring to FIG. 1, in one form, a vehicle authentication system 100, utilizes a decentralized blockchain, such as Bitcoin, Ethereum, among others, to securely distribute software updates and monitor unintended changes made to software programs stored in a vehicle by an unauthorized entity. The system 100 includes a vehicle blockchain manager 102 that may be managed by a vehicle manufacturer (i.e., original equipment manufacturer (OEM)) and a vehicle software controller 104 for verifying software updates with the vehicle blockchain manager prior to a software update.

In one application, the OEM develops and manufactures a vehicle fleet 106 that includes one or more vehicles 108 (vehicles 108-1, 108-2, and 108-3 in the figure). Each vehicle 108 includes the vehicle software controller 104 of the present disclosure that is configured to exchange data with the vehicle blockchain manager 102 by way of a wireless communication link. In one form, the vehicles 108 may have the same or different levels of automation that include, for example, fully-autonomous, semi-autonomous (i.e., some level of automation such as collision avoidance, lane control, lane change assist), and/or manually operated (i.e., no automation but may include warning systems).

As described further herein, the vehicle blockchain manager 102 is configured to generate a blockchain public address for the vehicle fleet 106 and perform a software update transaction to a blockchain network 110 using the public address. More particularly, as known, the blockchain network 110 is a peer-to-peer network that operates on a cryptographic protocol. For example, with regard to a Bitcoin network, members can send and receive Bitcoins by broadcasting digitally signed messages to the network 110 using Bitcoin cryptocurrency wallet software. Transactions are recorded into a distributed, replicated public database known as the blockchain, with consensus achieved by a proof-of-work system called mining. In addition to currency transactions, members may issue non-spendable transactions provided as "OP_RETURN."

Members of the blockchain network 110 may have different levels of control. For example, a member that is a full node is configured to connect to the peer-to-peer network, and verify, store, and transmit blocks to/from the rest of the network 110 while maintaining a full copy of the entire transaction history of the blockchain. A member may also be a lightweight client that communicates with a designated full node & only downloads pieces of information relevant to its address & public keys. In one form, each full node may include a computer system having computing devices, memory, servers, edge or distributed computing, and/or human machine interfaces such as monitors, touchscreens, audio systems, keyboards, mice, etc. The full node also includes wireless and wired communication capabilities using gateways, routers, base stations, satellites, cellular transceivers, and intermediary communication devices, among other components to support and access the blockchain network 110.

For the vehicle authentication system 100, the vehicle blockchain manager 102 is provided as a full node and the vehicles 108 having the vehicle software controller 104 are provided as lightweight clients that communicate with the vehicle blockchain manager 102 (i.e., a designated full node).

Figure 2:
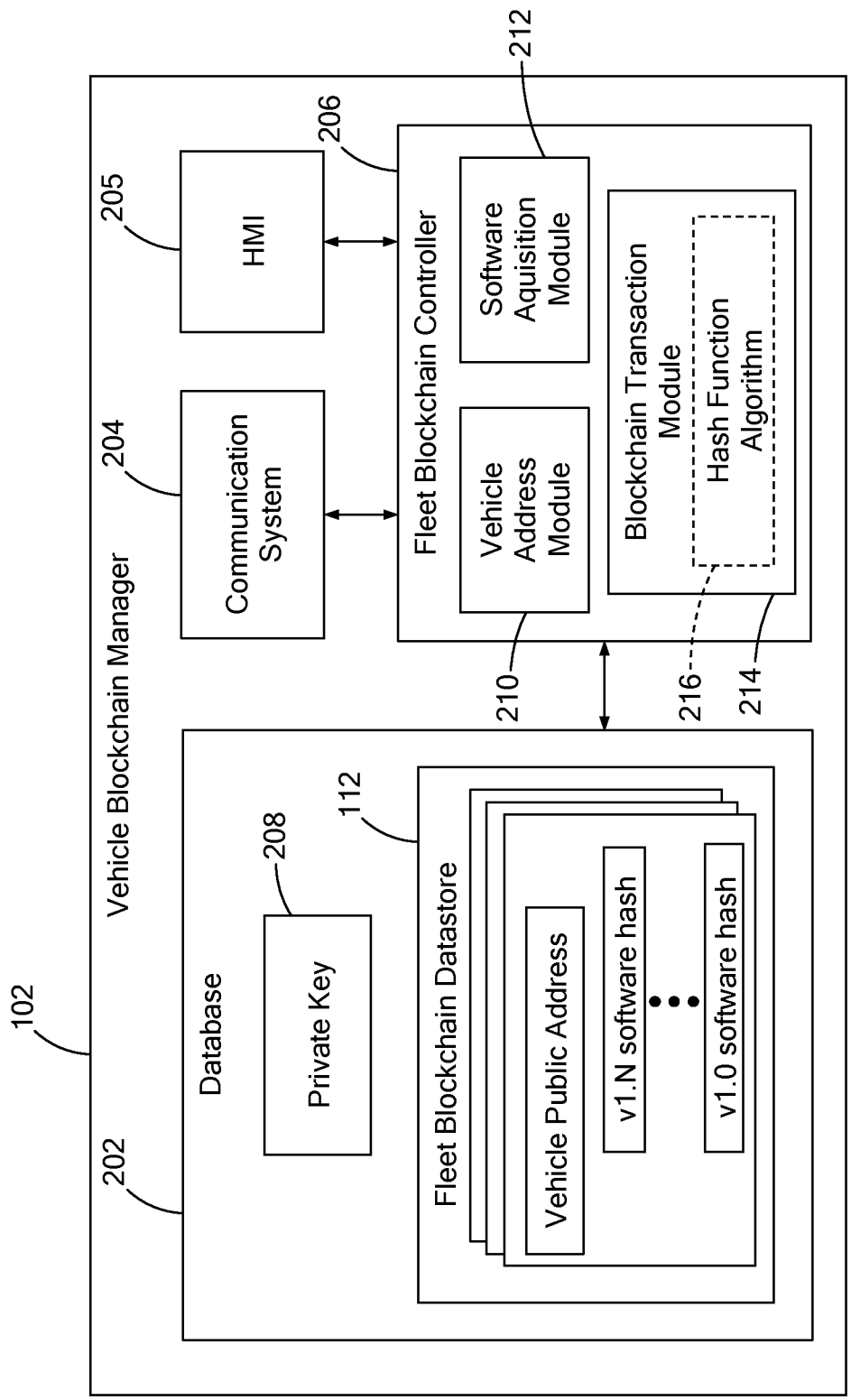
FIG. 2 illustrates a block diagram of a vehicle blockchain manager in accordance with the present disclosure.

As a full node, the vehicle blockchain manager 102 is configured to include a fleet blockchain datastore 112 that stores the transaction history of the blockchain for each public address. Referring to FIG. 2, in one form, the vehicle blockchain manager 102 includes a database 202, a communication system 204, one or more human machine interfaces (HMI) 205, and a fleet blockchain controller 206.

The database 202 is configured to store one or more private key(s) 208 for signing transactions and the fleet blockchain datastore 112 that is configured to store a copy of each transaction for a given public address. As known, Bitcoin utilizes a public-key cryptography for securing transactions transmitted in the blockchain network 110. In public-key cryptography, a private key is stored by the owner to decrypt a message and a public key may be disseminated to others to encrypt messages to be transmitted to the owner. Accordingly, security depends on the secrecy of the private key because anyone can encrypt messages using the public key, but cannot decode messages without the private key. For Bitcoin transactions, a private key is a secret number that allows cryptocurrency to be spent, and every Bitcoin public address has a matching private key. The private key is mathematically related to the public address, such that the public address can be calculated from the private key, but the private key cannot by calculated from the public address.

The communication system 204 is configured to communicably couple the vehicle blockchain manager 102 with external systems/networks, such as other full nodes of the blockchain network 110, the vehicle fleet 106, vehicle service departments that perform maintenance on vehicles, and/or other suitable systems/networks. In one form, the communication system 204 may include routers, transceivers, wired cables, input/output ports, and/or other suitable components for establishing wireless and/or wired communication links. For example, a combination of routers and cables can be used to communicably couple the communication system 204 to the internet for accessing the blockchain network 110. In another example, cellular transceivers may be used to communicably couple the communication system 204 to a vehicle 108.

The HMI 205 includes components such as keyboards, mice, touchscreen displays, laptop computers, graphical user interfaces, and other interfaces, for allowing a user to operate certain functions of the vehicle blockchain manager 102. For example, as described herein, a user may operate the HMI 205 to generate a new public address for a vehicle fleet.

The fleet blockchain controller 206 is configured to generate public addresses to be associated with, for example, the vehicle fleet 106, and to issue transactions on the blockchain network 110 when vehicle fleet 106 is released and for issuing software update notifications for the vehicle fleet 106. In one form, the fleet blockchain controller 206 is a computing device having a processor circuit, a memory circuit for storing code executed by the processor circuit, and other suitable hardware components to provide the functionality described herein. In one form, to transmit transactions via the blockchain network 110, the fleet blockchain controller 206 is configured to include various Bitcoin protocols for providing graphical user interfaces accessible by the user, generating public addresses, transmitting transactions, responding to queries, etc.

In one form, the fleet blockchain controller 206 includes a vehicle address module 210, a software acquisition module 212, and a blockchain transaction module 214. In one form, the vehicle address module 210 is configured to generate a unique public address for a vehicle fleet. The public address is an identifier that represents a location on the blockchain network to or from which transactions can be sent. In one form, the vehicle fleet may include one or more vehicles of the same make, model, trim, and/or body style, or other suitable grouping. For example, a single public address may be generated for all Jeep® vehicles, or different public addresses may be generated for different Jeep® models such that the Jeep Liberty® and the Jeep Renegade® have different public addresses. Accordingly, a vehicle fleet may be made of same or different vehicle type and is determined by the OEM. In one form, the fleet blockchain datastore 112 stores the public key and the transaction for each vehicle fleet. In another form, the vehicle address module 210 may generate one public address that is to be used for all vehicles manufactured by the OEM.

The software acquisition module 212 is configured to acquire an authorized software program to be stored by the vehicle fleet. The authorized software program may be provided by a user via the HMI 205 or provided remotely via the communication system 204.

Figure 3A:
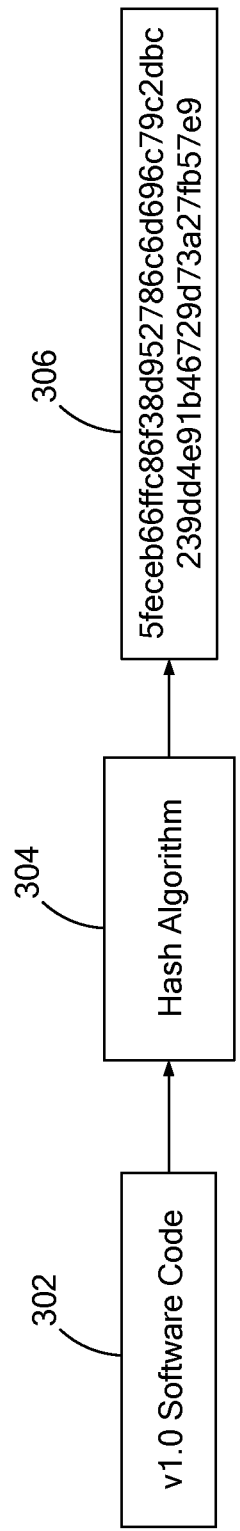
FIGS. 3A and 3B illustrate a software hash in accordance with the present disclosure.
Figure 3B:
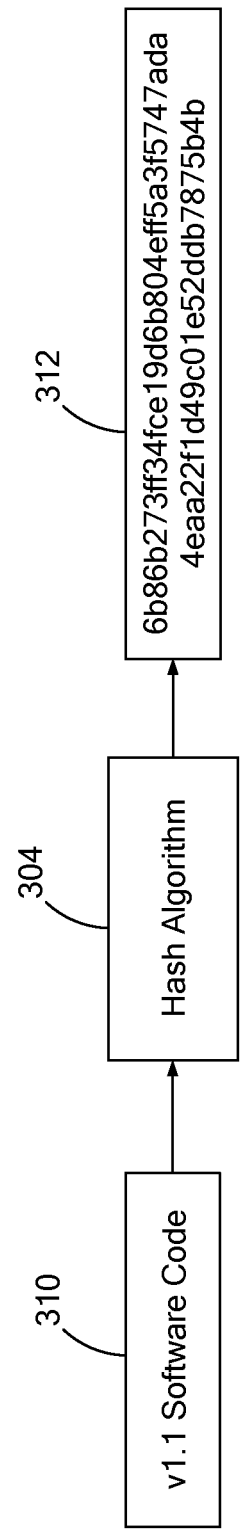

The blockchain transaction module 214 is configured to transmit a software identification transaction for a given vehicle fleet to the blockchain network 110 using the public address generated for the given vehicle fleet. In one form, the blockchain transaction module 214 is configured to execute a transaction including an OP_RETURN function and appending a hash function output of the authorized software program to the transaction as un-spendable transaction output. The transaction is signed with the private key associated with the public address and, thus, establishes the vehicle blockchain manager 102 as the originator of the transaction. The blockchain transaction module 214 is configured to include a hash function algorithm 216 that maps data of arbitrary size to a bit string of a fixed size such as hash algorithm SHA-256. For example, FIGS. 3A and 3B illustrate an example of a hash output of two different software programs. In FIG. 3A, a v1.0 software code 302 is hashed by a hash algorithm 304 to generate a first character string 306. In FIG. 3B, a v1.1 software code 310 is hashed by the hash algorithm 304 to generate a second character string 312 that is different than the character string 306. A copy of the transmitted transaction including the software hash is stored in the fleet blockchain datastore 112.

The un-spendable transaction is included in a future validated block and added to the blockchain. Accordingly, at the time of an authorized software update, the vehicle manufacturer, via the vehicle blockchain manager 102, may execute a new transaction, using the same public address for the corresponding vehicle, to update the latest software hash within the blockchain. Each transaction by a public address is timestamped based on the time of block validation on-chain, thereby creating and protecting a history of software versions by the consensus algorithm for the blockchain.

Referring again to FIG. 1, each vehicle 108 includes the vehicle software controller 104 that is configured to operate as a lightweight client to communicate with the vehicle blockchain manager 102 and with members of the vehicle fleet 106 and with other non-member vehicles. In one form, the vehicle software controller 104 is configured to store the public address issued for the vehicle fleet and the software hash associated with an authorized software program issued by the vehicle blockchain manager 102. The vehicle software controller 104 is also configured to verify software update requests for a recommended software program prior to acquiring the software program.

Figure 4:
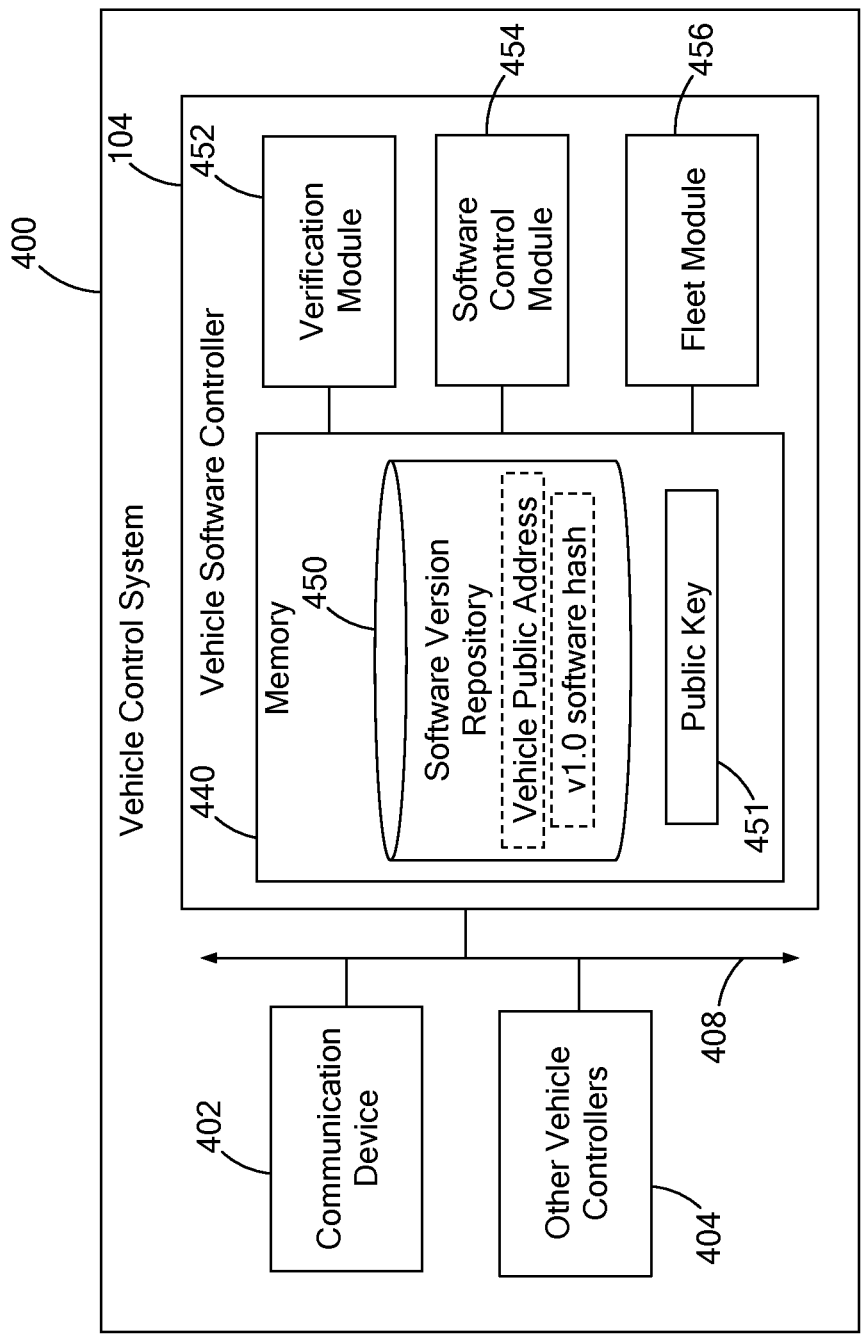
FIG. 4 is a block diagram of a vehicle control system of a vehicle software controller in accordance with the present disclosure.

Referring to FIG. 4, in one form, the vehicle software controller 104 is part of a vehicle control system 400 that also includes a communication device 402 and other vehicle controllers 404. The vehicle software controller 104 is configured to communicate with components of the vehicle control system 400 by way of a vehicle communication network 408 such as, but not limited to, a controller area network (CAN bus) or local interconnect network (LIN).

The communication device 402 is configured to establish wireless communication with external devices, such as the vehicle blockchain manager 102 and other vehicles via a wireless communication network, such as a dedicated short-range communication (DSRC) network, a cellular network (e.g., 3GPP and/or 5G), and/or satellite communication. In one form, the communication device 402 includes a transceiver and a computing device having a microprocessor and a memory for storing computer programs executable by the microprocessor. The communication device 402 is configured to process messages received to assess the receipt of the message and forward the message to the receipt by way of the vehicle communication network 408. The communication device 402 also receives data transmission requests from other components of the vehicle control system 400 to generate and transmit messages to an external device.

The other vehicle controllers 404 control sub-systems within the vehicles 108 by operating one or more devices within the vehicle 108. For example, the other vehicle controllers 404 may include, but are not limited to, a climate control controller configured to control an air-conditioning system having a compressor, heat exchangers, and expansion values to adjust the environment within a passenger cabin of the vehicle 108; a drive operation controller configured to control the drive operation of the vehicle 108 by operating an engine and/or motor, a brake system, and/or steering systems to move the vehicle 108; and a navigation system having a global positioning system (GPS) transceiver and configured to monitor the location of the vehicle 108 and determine travel routes for the vehicle 108.

To perform the various control operations, each of the other vehicle controllers 404 includes a memory for storing one or more software programs and a microprocessor for executing the software programs. Each of the controllers 404 may include other suitable components performing specific operations, such as input/output interfaces, a housing, and sensors, among other components. At times, the software programs provided within the other vehicle controllers 404 may be updated by the vehicle manufacturer. In one form, the vehicle manufacturer may broadcast the new software program by way of the wireless communication network supported by the vehicle control system and the vehicle blockchain manager 102. In another form, a service department may install the software program when a subject vehicle 108 is brought into the service department, as described below.

In one form, the vehicle software controller 104 includes a memory 440 storing a software version repository 450 and a public key 451, a verification module 452, a software control module 454, and a fleet module 456. The software version repository 450 is a memory that is configured to store the public address associated with the vehicle fleet 106 (i.e., a vehicle public address) and the software hash(es) that is issued using the public address for an authorized software program(s). The public key 451 is associated with the private key stored by the vehicle blockchain manager 102.

The verification module 452 is configured to verify a software upload request, which may be from an external device such as a service device. In one form, the software upload request includes a recommended software program to be uploaded. The verification module 452 hashes the recommended software program to obtain a contingent software hash and compares it with a current software hash stored in the repository 450. If the software hashes are the same, the verification module 452 ends communication with the external device since the vehicle control system 400 already has the recommended software program. If the software hashes are different, the verification module 452 confirms the current software hash with the vehicle blockchain manager 102 to determine if the recommended software program is an authorized software program. For example, in one form, in accordance with Bitcoin protocol, the verification module 452 sends a query (i.e., a wallet update request) to the vehicle blockchain manager 102 (i.e., a designated full node) requesting the current software hash for the current authorized software program issued using the public address on the blockchain network 110. The verification module 452 compares the current software hash from the vehicle blockchain manager 102 with the contingent software hash. If the software hashes match, the verification module 452 identifies the recommended software program as an authorized software program. If the software hashes do not match, the recommended software program is identified as being an unauthorized software program.

The verification module 452 is also configured to compare and verify the current software hash with members of its vehicle fleet. Specifically, the verification module 452 of a subject vehicle 108 may transmit/receive to/from another vehicle 108 a software verification request that includes the current software hash stored by the vehicle 108 transmitting the software verification request. Upon receiving the software verification request, the verification module 452 is configured to compare the software hash provided in the software verification request (i.e., a contingent software hash) with the software hashes stored in the repository 450. If the contingent software hash is the same as one of the software hashes, the verification module 452 identifies the contingent software hash as an authorized software hash. If the software hashes are different, the verification module 452 transmits a query to the vehicle blockchain manager 102 to obtain the current software hash for the public address. If the current software hash is the same as one of the software hashes in the repository 450, the verification module 452 identifies the contingent software hash as an unauthorized software hash and may flag the vehicle 108 that transmitted the contingent software hash as a non-compliant vehicle. If the current software hash does not match the software hashes in the repository 450, the verification module may request a software update to the software control module 454. In another form, the verification module 452 may also compare the current software hash from the vehicle blockchain manager 102 with the contingent software hash. If the hashes are different the contingent software hash is identified as an unauthorized software hash. If the hashes are the same, the verification module 452 may identify the contingent software hash as an authorized software hash.

The software control module 454 is configured to acquire a software program associated with an authorized software hash. For example, the software control module 454 acquires the recommended software program from the service device or requests an authorized software program directly from the vehicle blockchain manager 102. Based on the version identifier provided with the software program, the software control module 454 may transmit the software program to the respective vehicle controller that is to execute the software program via the network 408. In addition, the software control module 454 is configured to inhibit acquisition of the unauthorized software program by, for example, requesting the communication device 402 to discontinue communication with the external device requesting the software program update or by not responding to the external device. The software control module 454 further stores the authorized software hash in the repository 450 to maintain a record of the blockchain transactions.

The fleet module 456 is configured to verify the identity of a second vehicle requesting communication with a subject vehicle 108 of the vehicle fleet 106. In one form, the fleet module 456 is configured to transmit the public address and public key to the second vehicle and acquire the same from the second vehicle. If the public address and key correlate with that of the subject vehicle 108, the fleet module 456 identifies the second vehicle as a member of the vehicle fleet 106 to permit further communication. If the public address and key do not correlate, the fleet module 456 identifies the second vehicle as an unrelated vehicle and requests no further communication with the vehicle with regard to software data.

Figure 5:
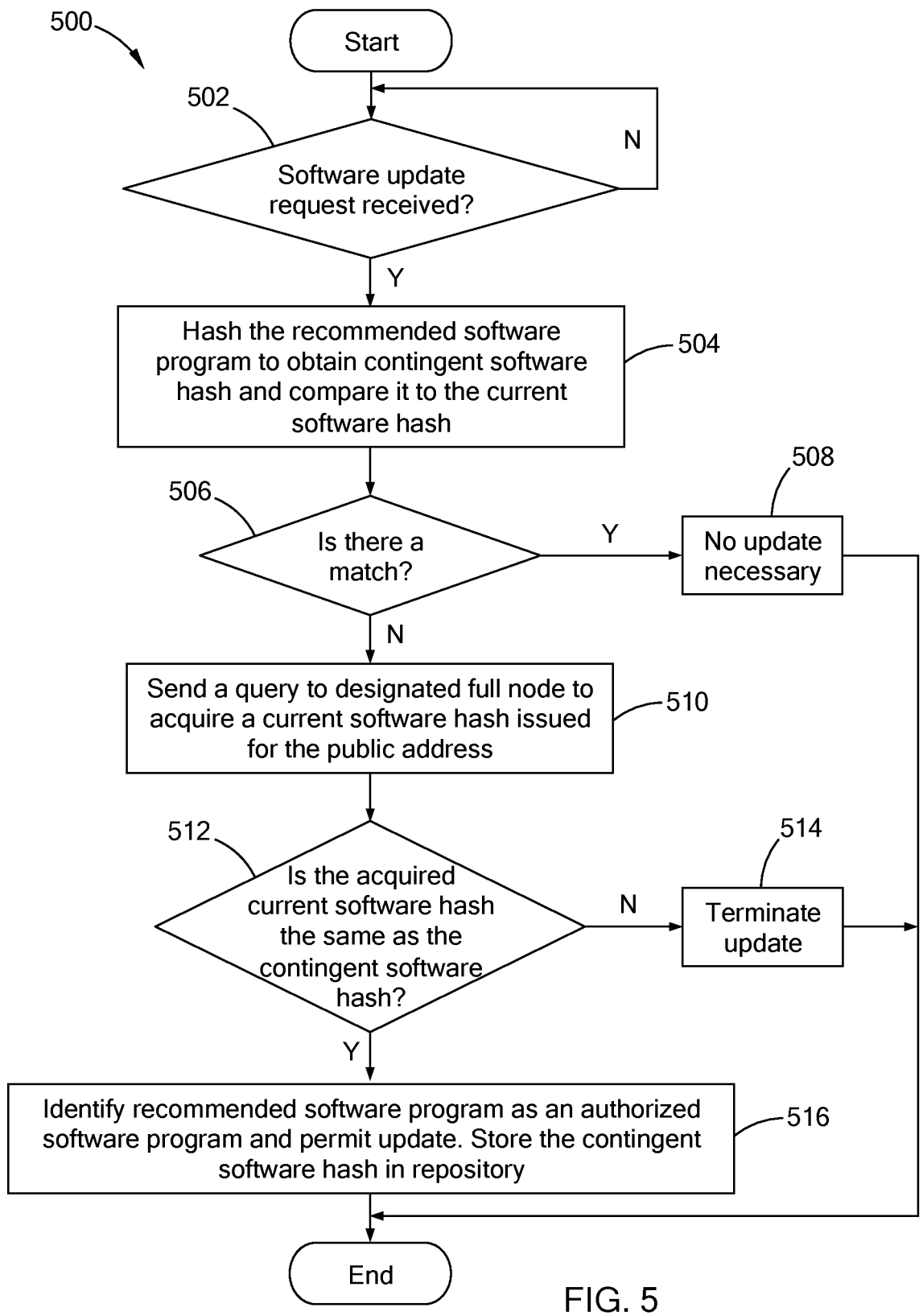
FIG. 5 is a flowchart of a software update request routine in accordance with the present disclosure.

Referring to FIG. 5, an example software update request routine 500 is provided and executed by the vehicle software controller of the present disclosure. At 502, the vehicle software controller determines if a software update request is received from an external device. For example, referring to FIG. 6, the subject vehicle 108 may be at a manufacturer service department 600 for a service, such as a routine checkup. The communication device of the subject vehicle 108 is in communication with a service device 604, such as a computing device that is configured to perform diagnostics and/or software updates. The service device 604 transmits a software update request 606 that includes a recommended software program for the subject vehicle 108. The transmission is generally represented by arrow A.

Returning to FIG. 5, if a software update request is received, at 504, the vehicle software controller, hashes the recommended software program to obtain a contingent software hash and compares it with the current software hash stored by the vehicle software controller to determine if the current software hash matches the contingent software hash, at 506. For example, in FIG. 6, the current software hash is "v1.0 software hash" for a v1.0 software program, which would be different from the contingent software hash that is "v1.1 software hash" for a v1.1 software program. Such variation is further demonstrated in FIGS. 3A and 3B in which two different software programs were hashed with the same hash algorithm to generate different software hashes.

If the current software hash is the same as the contingent software hash, the vehicle software controller, at 508, determines no update is necessary since the subject vehicle is up to date. However, if the hashes are different, the vehicle software controller is configured to query the vehicle blockchain manager for the current software hash for the public address associated with the vehicle, at 510.

Figure 6:
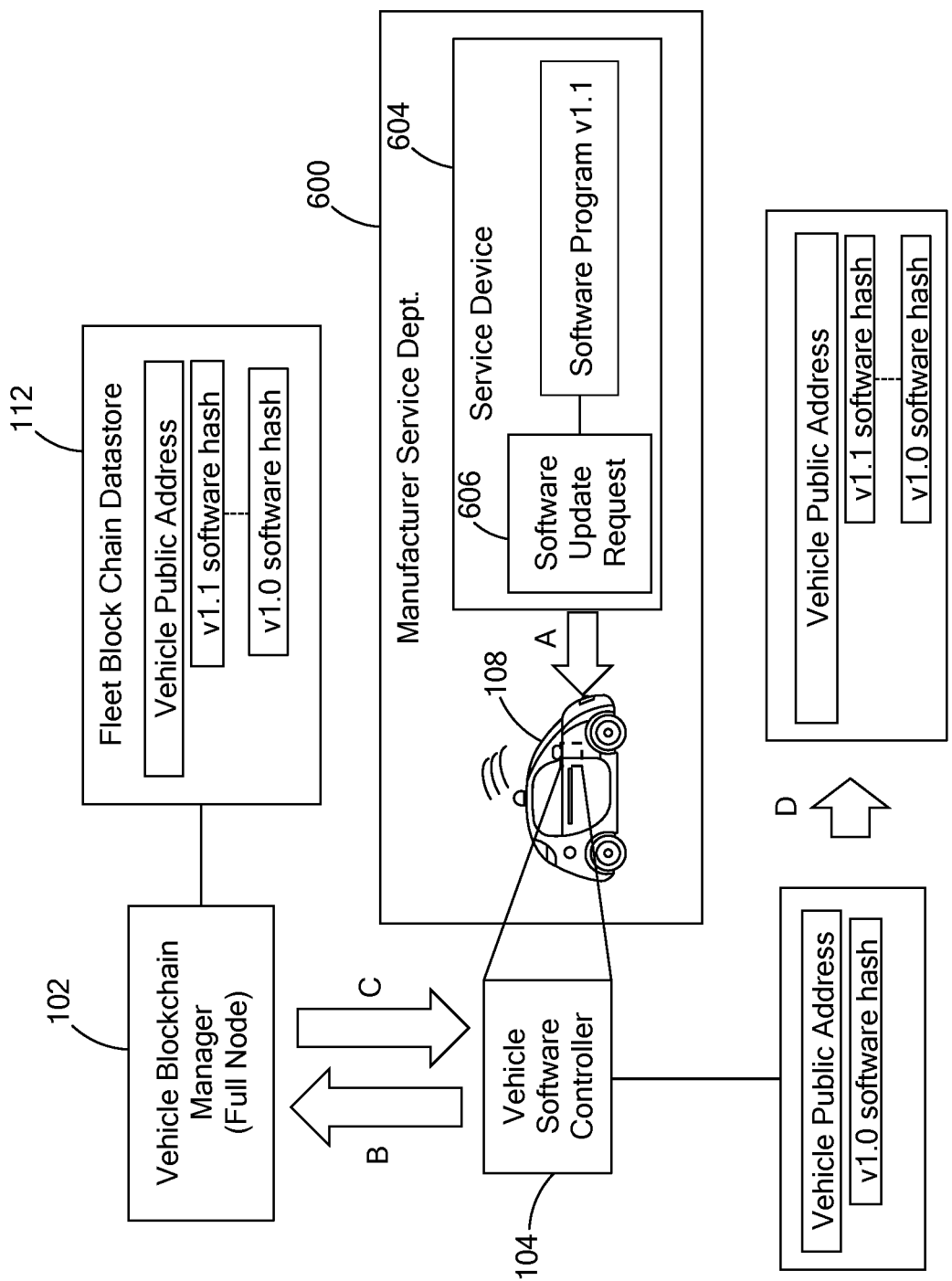
FIG. 6 illustrates software update authentication at a service department in accordance with the present disclosure.

For example, in FIG. 6, the vehicle software controller 104 transmits a query to the vehicle blockchain manager 102 (arrow B), which stores a complete history of each transaction issued for each public address. The vehicle blockchain manager 102 transmits the current software hash (e.g., "v1.1 software hash") to the vehicle software controller 104 (arrow C).

Referring back to FIG. 5, at 512, the vehicle software controller determines if the acquired current software hash from the vehicle blockchain manager is the same as the contingent software hash. If the two hashes are different, the controller, at 514, terminates the update by halting communication with the external device. That is, the software update request from the external device is an unauthorized update and, thus, the external device may be untrustworthy. In one form, the vehicle software controller may notify the vehicle blockchain manager of the unauthorized software program and/or the unauthorized service provider.

If the acquired current software hash is the same as the contingent software hash, the vehicle software controller determines that the recommended software program is an authorized software program and the update is permitted, and stores the acquired current software hash in the repository, at 516. For example, in FIG. 6, a copy of the v1.1 software hash issued for the public address is stored by the vehicle software controller (arrow D).

Figure 7:
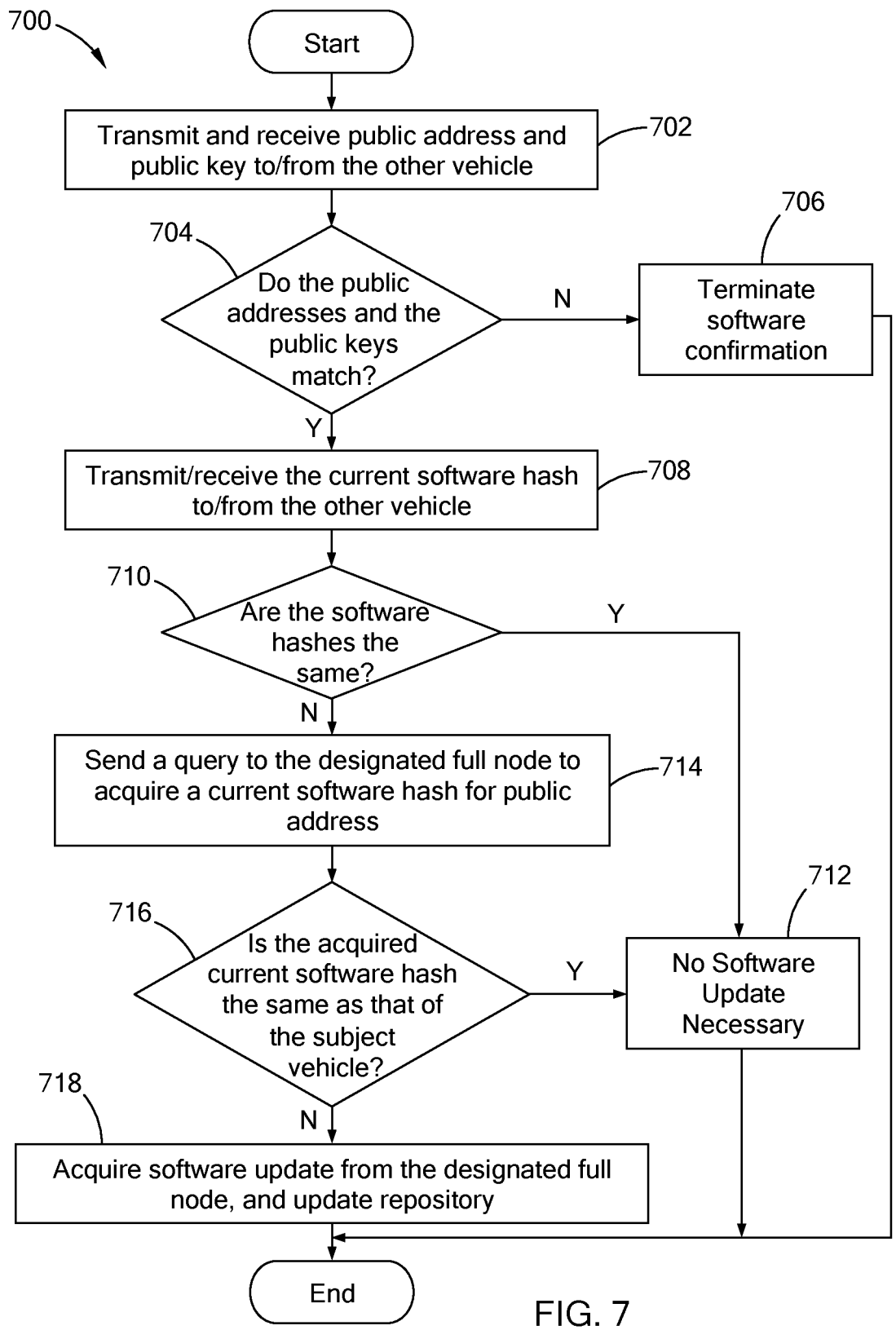
FIG. 7 is a flowchart of a vehicle-to-vehicle (V2V) software confirmation routine in accordance with the present disclosure.

Referring to FIG. 7, an example vehicle-to-vehicle (V2V) software confirmation routine 700 is executed by the vehicle software controller. The routine 700 may be executed when the communication device of the subject vehicle begins communication with another vehicle. At 702, the vehicle software controller transmits its public address and public key to the other vehicle and acquires the same from the other vehicle. At 704, the vehicle software controller determines if the public addresses and the public keys are the same to assess if the other vehicle is part of the same vehicle fleet as the subject vehicle. If they are not the same, the vehicle software controller terminates software confirmation with the other vehicle, at 706. In such a situation, the vehicle control system of the subject vehicle may communicate with the other vehicle to obtain other information such as position, speed, and travel direction of the other vehicle, but software confirmation itself ends.

If the public addresses and the public keys are the same, the other vehicle is a member of the same vehicle fleet, and the vehicle software controller, at 708, transmits the current software hash stored in the repository to the other vehicle and receives the current software hash of the other vehicle, which may be referred to as a contingent software hash. At 710, the vehicle software controller determines if its current software hash is the same as the contingent software hash. If so, the vehicle software controller determines that no software update is necessary, at 712. If the software hashes are different, the vehicle software controller is configured to query the vehicle blockchain manager for the current software hash issued for the public address, at 714. The vehicle software controller determines if the acquired current software hash is the same as the one stored in the repository, at 716. If it is, the vehicle software controller determines that no software update is necessary since the latest authorized software program is installed, at 712. If the software hashes are different, the vehicle software controller acquires a software update from the vehicle blockchain manager and updates the repository, at 718.

Figure 8:
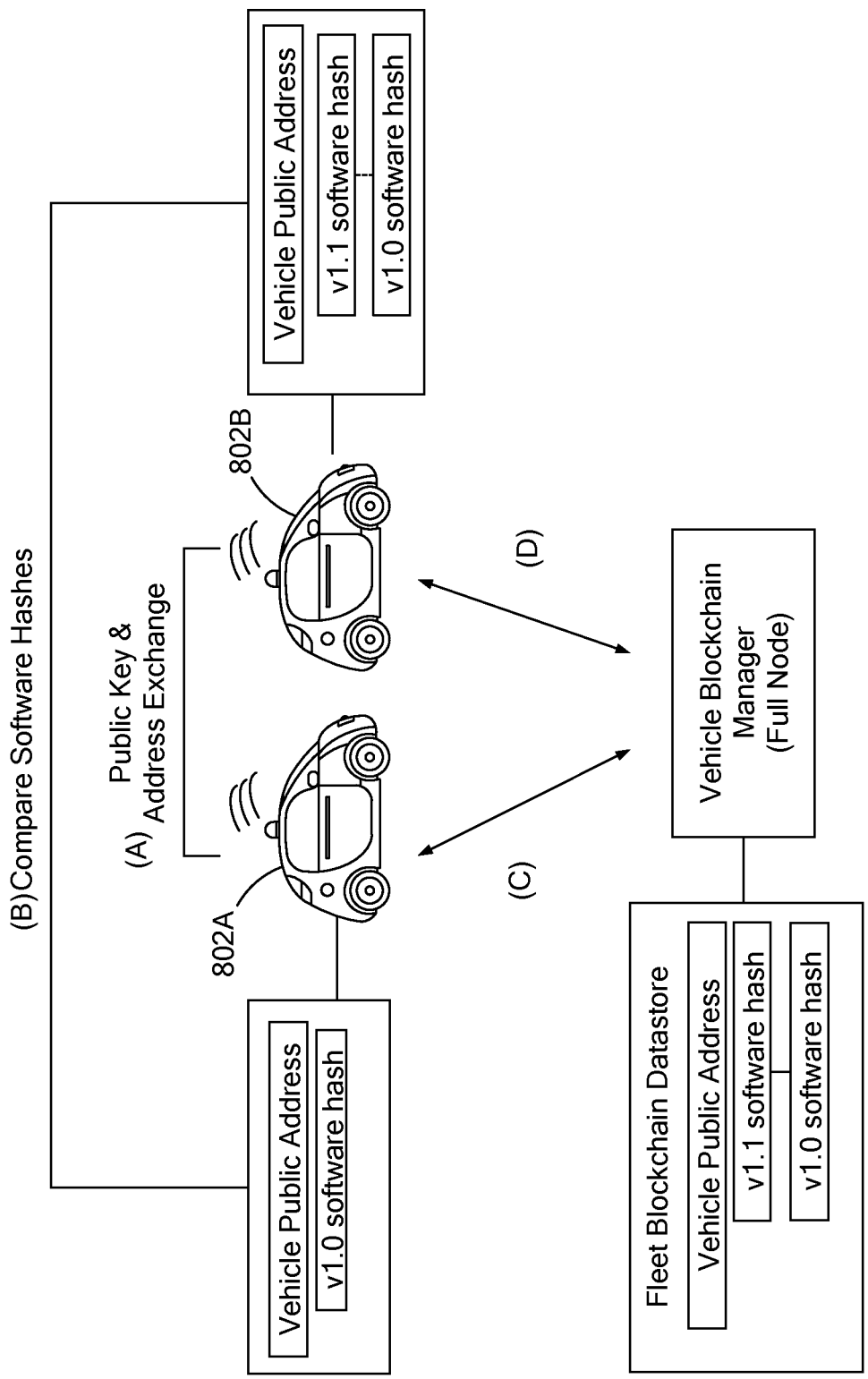
FIG. 8 illustrates a software verification between two vehicles in accordance with the present disclosure.

FIG. 8 illustrates an example V2V software verification between two vehicles 802A and 802B (collectively "vehicle 802") which are configured in a similar manner as vehicles 108 and, thus, have a vehicle software controller 104. At (A), the vehicles exchange public keys and public addresses to determine if they are part of the same vehicle fleet. If the addresses and keys match, the vehicles 802 exchange current software hashes and compare the software hashes to determine if the respective vehicle 802 is using the latest software program, at (B). If the software hashes do not match, each vehicle 802 communicates with the vehicle blockchain manager 102 to determine if its software hash is the same as the current software hash stored by the blockchain manager 102, as illustrated by arrows C and D. Per the example of FIG. 8, the current software hash stored by vehicle 802A is not the same as that of the vehicle blockchain manager 102 and, thus, the vehicle 802A proceeds to update its software program and repository. The vehicle 802B, on the other hand, does have the same software hash as that of the vehicle blockchain manager 102, so no update is required.

In one form of the present disclosure, since the vehicles having the vehicle software controller of the present disclosure operate as a lightweight client of a blockchain network, the vehicle can be configured as a mobile wallet to receive monetary transactions that can be moved by the owner of the private key, such as the vehicle blockchain manager. More particularly, in one application, a vehicle fleet may be used as a part of a ride share service or a car rental service. Users of the service may make financial transactions to the vehicle by way of a rideshare software application stored on the user's mobile device. For example, a user may request a ride to a set destination by way of the rideshare software application. The rideshare software application is configured to search for the closest available vehicle and displays a monetary fee associated with the ride to the user. If the user accepts, the rideshare software application requests the vehicle to pick up the user and drive the user to the destination. Using the rideshare software application, the user transmits a payment to the vehicle via the Bitcoin network.

Figure 9:
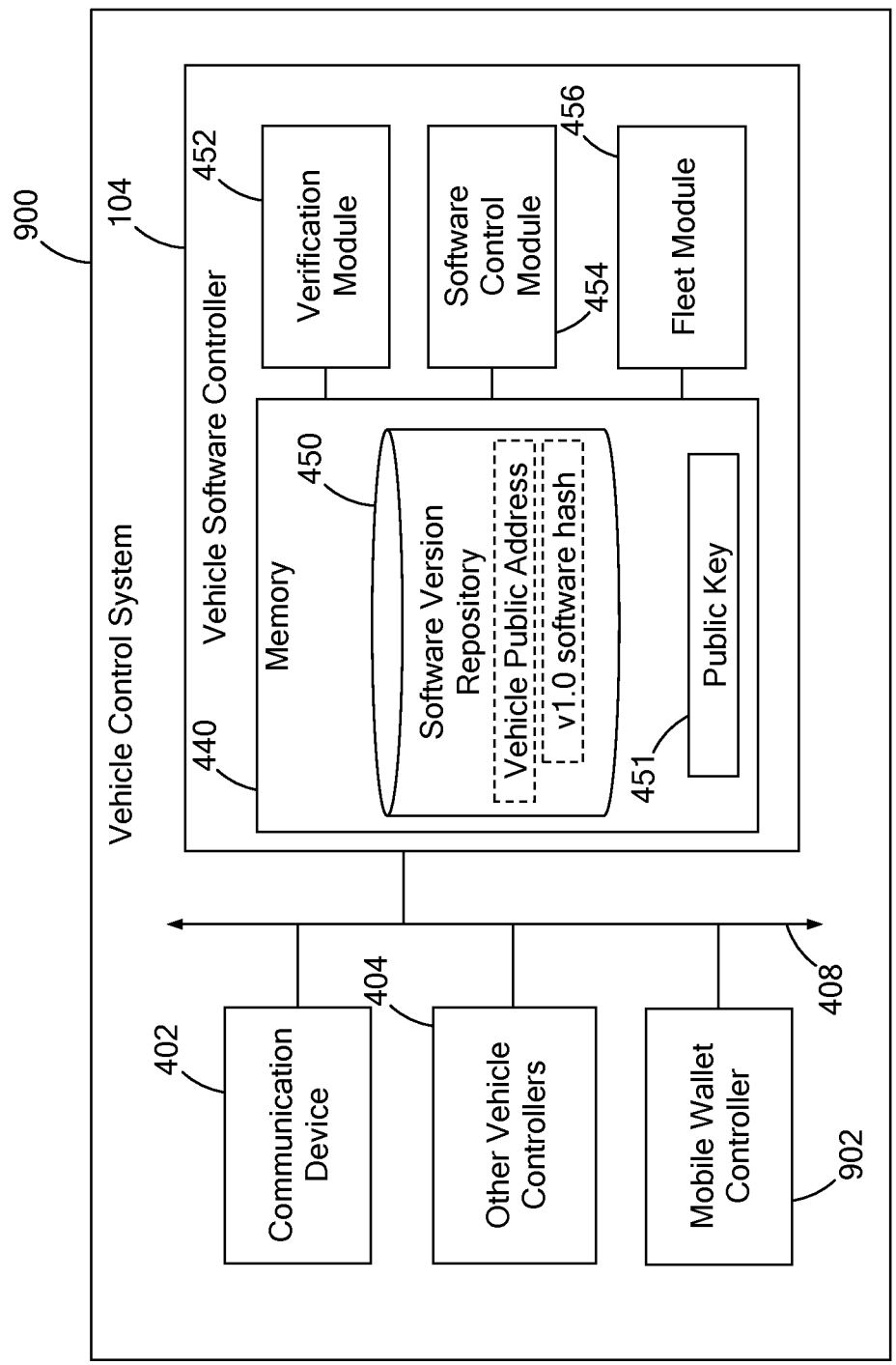
FIG. 9 is a block diagram of another form of a vehicle software controller in accordance with the present disclosure.

Referring to FIG. 9, to operate as a mobile wallet, a vehicle may include a vehicle control system 900 that is similar to the vehicle control system 400, but includes a mobile wallet controller 902 that is configured in accordance with Bitcoin protocol to receive Bitcoin spendable transactions from occupants, or even other vehicles, or surrounding roadside devices by way of vehicle-to-everything (V2X) communication. While the mobile wallet controller 902 is provided as a separate controller, the operation of the mobile wallet controller 902 may be integrated with the vehicle software controller 104.

Figure 10:
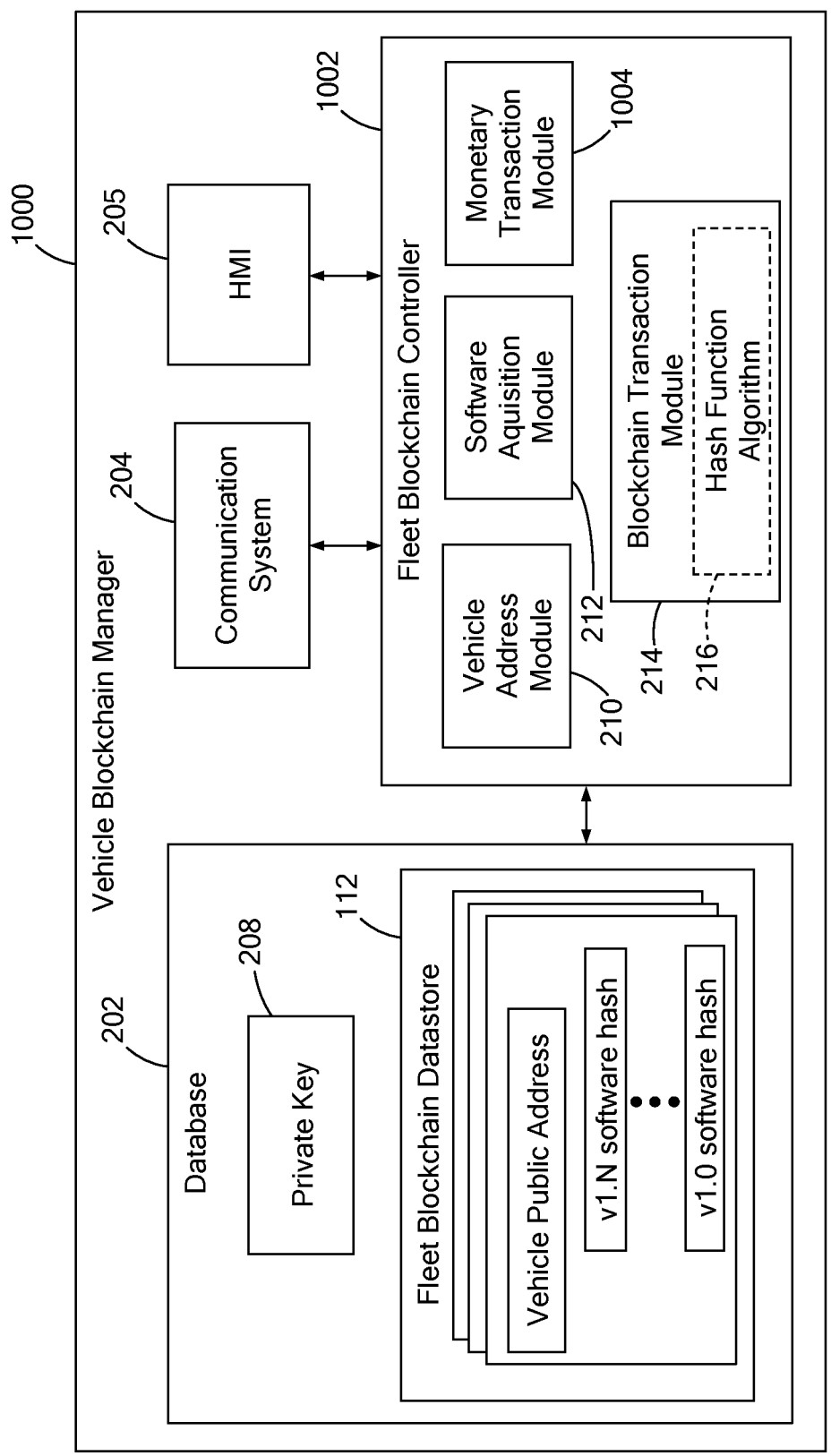
FIG. 10 is a block diagram of another form of a vehicle blockchain manager in accordance with the present disclosure.

Referring to FIG. 10, a vehicle blockchain manager 1000 is similar to the vehicle blockchain manager 102, but also includes a fleet blockchain controller 1002 having a monetary transaction module 1004. In one form, using the Bitcoin protocol, the monetary transaction module 1004 is configured to generate a deposit only receiving address for a vehicle fleet, and is able to monitor and move the funds deposited to the address based on the private key associated with the receiving address.

The vehicle control system of the present disclosure includes a vehicle software controller configured to provide a layer of security for altering the software programs used to control the vehicle. Specifically, the present disclosure provides a distributed vehicle cybersecurity system that adopts a do not trust, but verify configuration to securely execute software updates. By utilizing V2X communication and a decentralized blockchain, such as Bitcoin, the vehicle blockchain manager and vehicle software controller form an autonomous cybersecurity system for a vehicle fleet to inhibit malicious hacks and process update requests.

Based on the forgoing, in one form, the present disclosure is directed towards a controller configured to include a memory, a verification module, and a software control module. The memory includes a software version repository that stores a public address and one or more software hashes associated with the public address. The verification module is configured to verify a software upload request that includes a recommended software program to be uploaded. The verification module is configured to determine whether a contingent software hash indicative of the recommended software program matches a current software hash. The software control module is configured to acquire the recommended software program in response to the contingent software hash matching the current software hash and to store the current software hash in the software version repository.

In another form, the verification module is configured to identify the contingent software hash as an unauthorized hash in response to the contingent software hash not matching the current software hash, and the software control module is configured to inhibit acquisition of the recommended software program.

In yet another form, the verification module is configured to provide a query regarding the current software hash provided on a blockchain network and associated with the public address.

In another form, the verification module is configured to provide the query to a designated full node. The designated full node generated the public address and is configured to transmit a transaction to the blockchain network using the public address.

In yet another form, the one or more software hashes stored in the software version repository includes a software hash for each authorized software program acquired by the controller.

In another form, the verification module is configured to hash the recommended software program to obtain the contingent software hash.

In yet another form, controller is further configured to include a fleet module configured to acquire a public address and a key from a communicating vehicle. The memory is configured to store a public key associated with the public address, and the fleet module is configured to identify the communicating vehicle as a fleet vehicle in response to the public address and public key of the communicating vehicle matching the public address and the public key provided in the memory.

In another form, the verification module is configured to transmit a software verification request from the fleet vehicle to obtain a current software hash for the fleet vehicle, and query a designated full node to obtain a current software hash issued for the public address in response to the one or more software hashes in the software repository not matching that of the fleet vehicle. The software control module is configured to acquire a current authorized software program in response to the current software hash from the designated full node not matching the one or more software hashes stored in the software repository.

In yet another form, the vehicle control system further comprises a mobile wallet controller configured to receive Bitcoins via a Bitcoin network.

In one form, the present disclosure is directed toward a vehicle authentication system that includes the vehicle control system and a vehicle blockchain manager. The vehicle blockchain manager is configured to communicate with a Bitcoin network and generate the public address. The vehicle blockchain manager is configured to transmit a un-spendable transaction to the Bitcoin network using the public address. The un-spendable transaction includes an authorized software hash for an authorized software program.

In one form, the present disclosure is directed toward a method that includes storing, in a memory provided in a vehicle controller, a public address and one or more software hashes associated with the public address. The public address is for a vehicle fleet comprising at least one vehicle. The method further includes receiving a recommended software program to be uploaded by the vehicle controller, determining whether a contingent software hash indicative of the recommended software program matches a current software hash, and storing the recommended software program in response to the contingent software hash matching the current software hash.

In another form, the method further includes storing the current software hash in the memory in response to the storing of the recommended software program.

In yet another form, the method further includes inhibiting acquisition of the recommended software program in response to the contingent software hash not matching the current software hash.

In another form, the method further includes querying a vehicle blockchain manager to obtain the current software hash associated with the stored public address, wherein the vehicle blockchain manager generates the public address and issues transactions on a blockchain network using the public address.

In yet another form, the method further includes hashing the recommended software program to obtain the contingent software hash.

In another form, the memory is configured to store a public key, and the method further includes receiving, from a communicating vehicle, a public address and a public key, and identifying the communicating vehicle as a fleet vehicle in response to the public address and the public key of the communicating vehicle matching the public address and the public key stored in the memory.

In yet another form, the method further includes transmitting a software verification request to the fleet vehicle to obtain a current software hash for the fleet vehicle, where the software verification request includes a current software hash stored in the memory, querying a vehicle blockchain manager to obtain a current software hash issued for the public address in response to the one or more software hashes stored in the memory not matching the current software hash of the fleet vehicle, and acquiring a current authorized software program in response to the obtained current software hash not matching the one or more software hashes stored in the memory.

In another form, the method further includes generating the public address for the vehicle fleet on a blockchain network, hashing a software program provided in the vehicle fleet in accordance with a preselected hashing algorithm to obtain a software hash, transmitting an un-spendable transaction using the public address to the blockchain network, wherein the un-spendable transaction includes the software hash, and storing the public address and the software hash in a database.

In yet another form, the method further includes transmitting the current software hash from the database in response to a query from one of the at least one vehicle.

In another form, the method further includes receiving, by the at least one vehicle, a monetary Bitcoin transaction.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A vehicle control system provided in a vehicle comprising:
   a controller configured to include:
      a memory including a software version repository to store a public address of the vehicle and one or more software hashes associated with the public address of the vehicle;
      a verification module configured to verify a software upload request that includes a recommended software program to be uploaded by hashing the recommended software program to obtain a contingent software hash of the recommended software program, wherein the verification module is configured to verify the contingent software hash in response to the contingent software hash of the recommended software program not matching a current software hash of the vehicle,
      wherein the verification module is configured to determine whether a software update is needed based on a matching between the contingent software hash of the recommended software program and a current software hash of a blockchain network, wherein the current software hash of the blockchain network is associated with the public address of the vehicle; and
      a software control module configured to acquire the recommended software program in response to the contingent software hash of the recommended software program matching the current software hash of the blockchain network and to store the current software hash of the recommended software program in the software version repository.

2. The vehicle control system of claim 1, wherein:
   the verification module is configured to identify the contingent software hash of the recommended software program as an unauthorized hash in response to the contingent software hash of the recommended software program not matching the current software hash of the blockchain network, and
   the software control module is configured to inhibit acquisition of the recommended software program.

3. The vehicle control system of claim 1, wherein the verification module is configured to provide a query regarding the current software hash of the blockchain network and associated with the public address of the vehicle.

4. The vehicle control system of claim 3, wherein the verification module is configured to provide the query to a designated full node, wherein the designated full node generates the public address and is configured to transmit a transaction to the blockchain network using the public address.

5. The vehicle control system of claim 1, wherein the one or more software hashes stored in the software version repository includes a software hash for each authorized software program acquired by the controller.

6. The vehicle control system of claim 1, wherein the memory is configured to store a public key associated with the public address, wherein the controller is further configured to include a fleet module configured to acquire a second public address and a second public key from a communicating vehicle, and wherein the fleet module is configured to identify the communicating vehicle as a fleet vehicle in response to the second public address and second public key of the communicating vehicle matching the public address and the public key provided in the memory.

7. The vehicle control system of claim 6, wherein:
   the verification module is configured to:
      transmit a software verification request to the fleet vehicle to obtain a current software hash for the fleet vehicle, and
      query a designated full node to obtain a current software hash issued for the public address provided in the memory in response to the one or more software hashes in the software version repository not matching the current software hash of the fleet vehicle, and
   the software control module is configured to acquire a current authorized software program in response to the current software hash from the designated full node not matching the one or more software hashes stored in the software version repository.

8. The vehicle control system of claim 1 further comprising a mobile wallet controller configured to receive Bitcoins via a Bitcoin network.

9. A vehicle authentication system comprising:
   the vehicle control system of claim 1; and
   a vehicle blockchain manager configured to communicate with a Bitcoin network and generate the public address, wherein the vehicle blockchain manager is configured to transmit an un-spendable transaction to the Bitcoin network using the public address, wherein the un-spendable transaction includes an authorized software hash for an authorized software program.

10. A method comprising:
storing, in a memory provided in a vehicle controller, a public address and one or more software hashes associated with the public address, wherein the public address is for a vehicle fleet comprising at least one vehicle, and wherein the memory is configured to store a public key;
receiving a recommended software program to be uploaded by the vehicle controller;
determining whether a contingent software hash indicative of the recommended software program matches a current software hash of the vehicle;
storing the recommended software program in response to the contingent software hash matching the current software hash of the vehicle;
receiving, from a communicating vehicle, a public address and a public key;
identifying the communicating vehicle as a fleet vehicle in response to the public address and the public key of the communicating vehicle matching the public address and the public key stored in the memory;
transmitting a software verification request to the fleet vehicle to obtain a current software hash for the fleet vehicle, wherein the software verification request includes the current software hash of the vehicle stored in the memory;
querying a vehicle blockchain manager to obtain a current software hash issued for the public address in response to the one or more software hashes stored in the memory not matching the current software hash of the fleet vehicle; and
acquiring a current authorized software program in response to the issued current software hash not matching the one or more software hashes stored in the memory.

11. The method of claim 10 further comprising storing the issued current software hash in the memory in response to the storing of the recommended software program.

12. The method of claim 10 further comprising inhibiting acquisition of the recommended software program in response to the contingent software hash not matching the current software hash of the vehicle.

13. The method of claim 10 further comprising querying a vehicle blockchain manager to obtain the current software hash issued for the stored public address, wherein the vehicle blockchain manager generates the public address and issues transactions on a blockchain network using the public address.

14. The method of claim 10 further comprising hashing the recommended software program to obtain the contingent software hash.

15. The method of claim 10 further comprising:
generating the public address for the vehicle fleet on a blockchain network;
hashing a software program provided in the vehicle fleet in accordance with a preselected hashing algorithm to obtain a software hash;
transmitting an un-spendable transaction using the public address to the blockchain network, wherein the un-spendable transaction includes the software hash; and
storing the public address and the software hash in a database.

16. The method of claim 15 further comprising transmitting the software hash from the database as the issued current software hash in response to a query from one of the at least one vehicle.

17. The method of claim 10 further comprising receiving, by the at least one vehicle, a monetary Bitcoin transaction.

18. A method for authorizing a software upload request of a vehicle including a vehicle controller, the software upload request including a recommended software program, the method comprising:
storing, in a memory provided in the vehicle controller, a public address of the vehicle and one or more software hashes associated with the public address;
hashing the recommended software program to obtain a contingent software hash of the recommended software program;
verifying the contingent software hash of the recommended software program in response to the contingent software hash of the recommended software program not matching a current software hash of the vehicle;
determining whether a software update is needed based on a matching between the contingent software hash of the recommended software program and a current software hash of a blockchain network, wherein the current software hash of the blockchain network is associated with the public address of the vehicle;
acquiring the recommended software program in response to the contingent software hash of the recommended software program matching the current software hash of the blockchain network; and
storing the recommended software program of the recommended software program in the memory.

19. The method of claim 18 further comprising:
identifying the contingent software hash of the recommended software program as an unauthorized hash in response to the contingent software hash of the recommended software program not matching the current software hash of the blockchain network; and
inhibiting acquisition of the recommended software program in response to identifying the contingent software has as the unauthorized hash.

20. The method of claim 18 further comprising providing a query regarding the current software hash of the blockchain network and associated with the public address of the vehicle.

* * * * *